(12) United States Patent
Towler et al.

(10) Patent No.: US 7,789,658 B2
(45) Date of Patent: Sep. 7, 2010

(54) FIRED HEATER

(75) Inventors: Gavin P. Towler, Inverness, IL (US);
Randy S. Stier, Schaumburg, IL (US);
Christopher Naunheimer, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 837 days.

(21) Appl. No.: 11/611,106

(22) Filed: Dec. 14, 2006

(65) Prior Publication Data
US 2008/0141648 A1    Jun. 19, 2008

(51) Int. Cl.
*F23C 5/00* (2006.01)
*F24C 5/00* (2006.01)
(52) U.S. Cl. .......................... 431/174; 126/93
(58) Field of Classification Search ............... 60/39.181, 60/39.182, 784; 122/7 R, 7 B, 22, 23, 25; 126/108, 117; 431/174, 178, 179
See application file for complete search history.

(56) References Cited

U.S. PATENT DOCUMENTS

| | | | | |
|---|---|---|---|---|
| 2,598,840 A * | 6/1952 | Schutte | ....................... | 196/110 |
| 3,366,373 A * | 1/1968 | Reed | ........................... | 432/222 |
| 3,958,922 A * | 5/1976 | Goodnight et al. | .......... | 432/222 |
| 4,109,469 A | 8/1978 | Carson | ........................ | 60/676 |
| 4,287,377 A | 9/1981 | Maslin et al. | ............... | 585/634 |
| 4,338,788 A | 7/1982 | Fink | ............................. | 60/648 |
| 4,392,346 A | 7/1983 | Fink | ........................ | 60/39.04 |
| 4,428,201 A | 1/1984 | Carson | ........................ | 60/648 |
| 4,428,202 A | 1/1984 | Carson | ........................ | 60/648 |
| 4,428,203 A | 1/1984 | Carson | ........................ | 60/648 |
| 4,471,619 A | 9/1984 | Nolley, Jr. | .................... | 60/648 |
| 4,912,282 A | 3/1990 | Klaus | ........................ | 585/648 |
| 4,976,100 A | 12/1990 | Lee | ............................ | 60/39.02 |
| 5,788,724 A | 8/1998 | Carugati et al. | ........... | 48/197 R |
| 6,298,651 B1 | 10/2001 | Iijima | ........................ | 60/39.02 |
| 2006/0116543 A1 | 6/2006 | Bellet et al. | ................. | 585/648 |

FOREIGN PATENT DOCUMENTS

WO    WO 2006/027610 A1    3/2006

OTHER PUBLICATIONS

Linnhoff and Townsend Chem. Engr. Prog., 72, 78 (1982).
Terrible et al., Hydrocarbon Processing, 43, vol. 78 (Dec. 1999).

* cited by examiner

*Primary Examiner*—Michael Cuff
*Assistant Examiner*—Gerald L Sung
(74) *Attorney, Agent, or Firm*—James C Paschall

(57) ABSTRACT

A fired heater has two types of burners. The first burner is located in a duct which provides oxygen-containing gas to the heater to be combusted with the fuel provided by the burner. The second burner is located in the heater and provides both air and fuel for combustion. The heater may be located downstream of a gas turbine engine that cogenerates electricity and provides the oxygen-containing gas.

7 Claims, 4 Drawing Sheets

FIRED HEATER

BACKGROUND OF THE INVENTION

Oil refiners are interested in improving the energy efficiency of atmospheric crude oil distillation. Atmospheric crude oil distillation columns typically separate crude oil into residue, gas oil, distillate, kerosene and naphtha fractions. Atmospheric crude oil distillation units are highly heat integrated, and heat is recovered from the products of the atmospheric distillation column and used to preheat the crude oil feed by indirect heat exchange. The remaining heat that is required for feed heating is usually supplied by sending the preheated crude oil to a fired heater, conventionally termed a crude heater, before it enters the atmospheric distillation column.

Heat can be recovered from the exhaust of a gas turbine engine and used for process heating. Linnhoff and Townsend, "CHEM. ENGR. PROG.," 72, 78 (1982) described recovery of turbine exhaust heat for process heating. It is also known to those skilled in the art that the exhaust gas from a gas turbine engine contains a significant amount of residual oxygen. This is because gas turbine engines are usually operated with an air flow in large excess of that required by stoichiometry in order to limit the turbine inlet temperature for metallurgical reasons. Because of the residual oxygen content, the turbine exhaust can be secondarily fired with a duct burner or in another furnace. This practice is widely used in heat recovery steam generators placed on gas turbine exhaust streams. Terrible et al., "HYDROCARBON PROCESSING, 43, vol. 78 (Dec. 1999) describe a steam methane reforming process in which the reforming furnace is heated by secondary firing of a gas turbine exhaust gas.

Secondary firing of gas turbine exhaust would seem to be an attractive means of supplying heat to an atmospheric crude oil distillation column. This concept has never been commercially practiced, however, because the availability of gas turbine engines is low relative to the requirements for a crude heater. Aeroderivative gas turbine engines are available only typically in the range of 97% to 99% of the time. Part of the lost time is due to planned outages for maintenance, as the engines require bore scoping once or twice each year, which entails a 24-48 hour shutdown, as well as more major overhauls after 25,000 and 50,000 hours of operation. The remaining down time between 2 and 10 days per year is due to unplanned shutdowns. For example, the GE LM6000 gas turbine engine has an availability of 98.8%, corresponding to an average of 105 hours of down time per year, of which 36 hours are for planned maintenance and 69 hours are for unplanned outages. An atmospheric distillation unit is usually required to run continuously for a period of three to five years, and any interruption in this operation necessarily stops all production in the refinery. Consequently, refiners are reluctant to exploit this energy-saving opportunity if the reliability of the entire refinery is potentially jeopardized.

SUMMARY OF THE INVENTION

We have discovered an apparatus of a fired heater that has two types of burners. The first burner is located in a duct which provides oxygen-containing gas to the heater to be combusted with the fuel provided by the burner. The second burner is located in the heater and provides both air and fuel for combustion. The heater may be located downstream of a gas turbine engine which may cogenerate electricity. Secondary firing of the gas turbine exhaust, which is hot and contains oxygen, by the duct burners serves as the primary heat input into the heater. The second burners can be run at minimal capacity and quickly turned up if the supply of oxygen-containing gas is interrupted. Hence, reliability of the fired heater is independent of the supply of oxygen-containing gas through the ducts.

Additional features and embodiments of the invention are described in detail below.

DETAILED DESCRIPTION OF THE INVENTION

Figure 1:
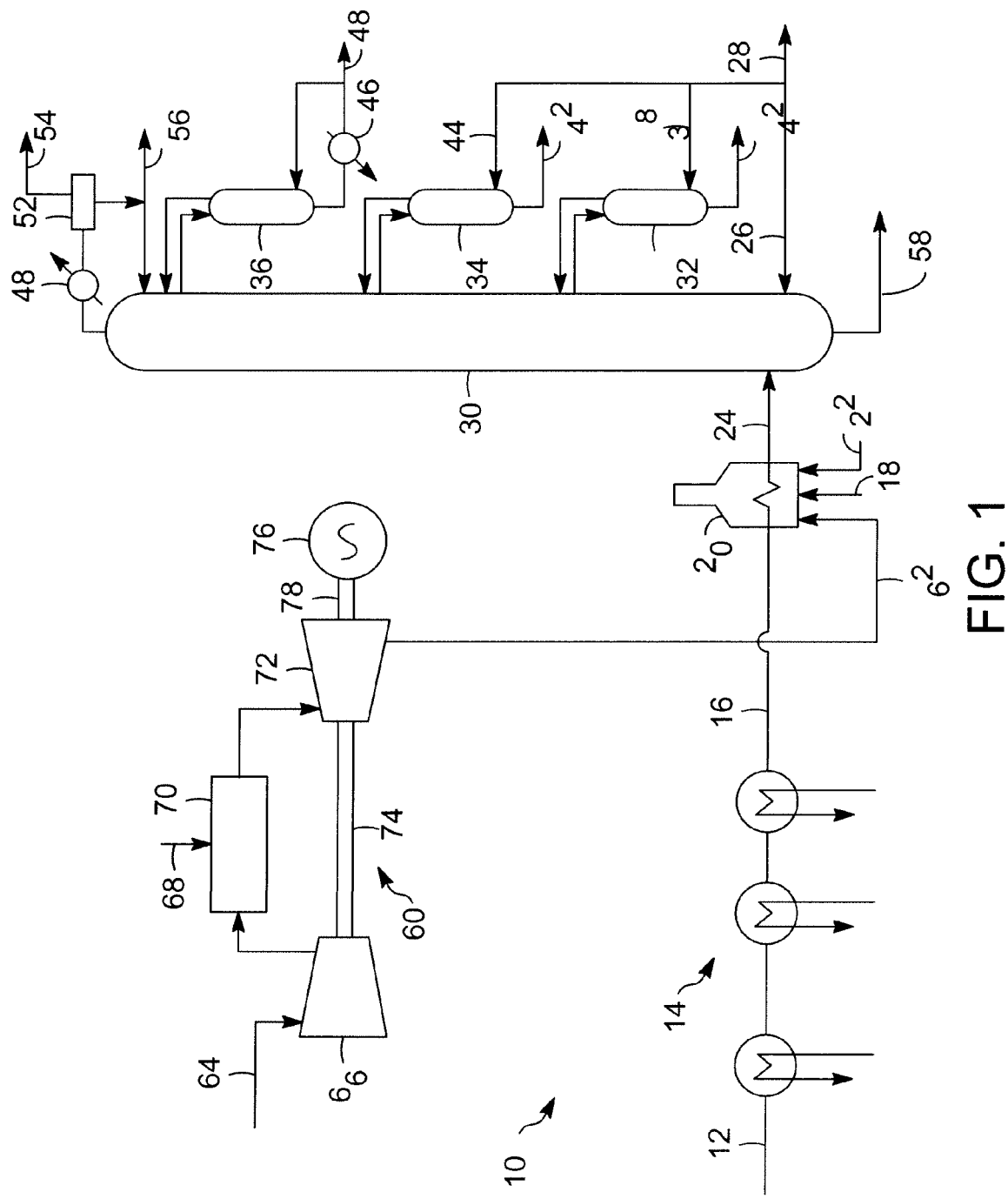
FIG. 1 is a schematic view of a flow scheme incorporating the present invention.

A schematic view of an apparatus 10 that can incorporate a fired heater 20 of the present invention is provided in FIG. 1. Although the invention is described with respect to an atmospheric crude distillation column 30, the invention can be used to introduce cogeneration into other processes that have large fired heater duties such as catalytic reforming furnaces and xylene column reboiler furnaces.

Crude oil feed enters the process in line 12 and passes through a series of heat exchangers 14 that indirectly transfer heat to the crude oil preferably from the products of the atmospheric distillation column 30. The oil is transferred in line 16 and heated in a crude fired heater 20 which is supplied with fuel in line 18, oxygen preferably from air in line 22 and heated oxygen-containing gas in line 62. The heated crude oil is then charged in line 24 to a bottom of the atmospheric distillation column 30. Steam is added to the distillation column 30 in line 26 from steam header 28. Various distillation products are withdrawn and stripped in side columns 32, 34, and 36 with steam from steam header 28. A cut of atmospheric gas oil is withdrawn near a bottom of the atmospheric distillation column and stripped with stream from line 38 in a side stripper 32. Steam and hydrocarbons lighter than atmospheric gas oil are returned to the atmospheric distillation column 30 and atmospheric gas oil is recovered in line 42. A cut of diesel is withdrawn near a middle of the atmospheric distillation column 30 and stripped with stream from line 44 in the side stripper 34. Steam and hydrocarbons lighter than diesel are returned to the atmospheric distillation column 30 and diesel is recovered in line 42. A cut of kerosene is withdrawn near a top of the atmospheric distillation column 30 and distilled in side column 36. A bottom stream from the side column 36 is reboiled by reboiler 46. Hydrocarbons lighter than kerosene are returned to the atmospheric distillation column 30 and kerosene is recovered in line 48. A cut of naphtha and lighter hydrocarbons is withdrawn from the overhead of the atmospheric distillation column 30 and cooled or condensed by cooler 48 and transported to a receiver 52. A portion of the liquid from the receiver 52 is returned to the atmospheric distillation column 30, and another portion is recovered in line 56. Hydrocarbon gases lighter than naphtha are withdrawn from the receiver 52 in line 54. A bottoms residue is withdrawn from the bottom of atmospheric distillation column in line 58. All of the cuts recovered in lines 48, 46, 42, 54, 56 and 58 may be subjected to further processing.

Heated oxygen-containing gas produced in one or more of a gas turbine engine 60 is supplied to the crude heater 20 in line 62. Air in line 64 enters a compressor 66 of the gas turbine engine 60 and is compressed to a high pressure. Fuel from line 68 is injected into the compressed air in the combustor 70 of the gas turbine engine 60 to generate a hot, high pressure flue gas. The flue gas is then expanded through a turbine 72 of the gas turbine engine 60. The turbine 72 is connected to a main shaft 74 which is coupled to the compressor 66. The hot gas expanding in the turbine 72 rotates the turbine blades, thereby turning the main shaft 74 which then rotates the compressor blades in the compressor 66. The turbine 72 is also connected to a dynamo 76 to generate electricity preferably through an auxiliary shaft 78. The expanded exhaust gas is then sent to the crude heater in line 62. The hot exhaust gas is partially depleted of oxygen, but has sufficient oxygen to combust added fuel. The hot exhaust gas is mixed with fuel and burned in the crude fired heater 20. The energy released in the combustion process is transferred to the crude oil feed via a combination of radiant, convective and conductive heat transport. As a result of using this process arrangement, the total fuel that is fired in the crude oil distillation process is increased, but the incremental fuel fired is converted to electricity at a high marginal efficiency. This is illustrated by the example below.

EXAMPLE

The example is based on the simulated performance of the GE LM6000 gas turbine engine. A crude distillation unit was simulated based on treatment of a Light Arabian crude oil. Results are indicative of the process performance. It is also expected that similar results would be obtained with other engines and with different crude oil feeds.

TABLE

Crude Distillation Costs With and Without Cogeneration

Price Data

| Utility | Units | $/Unit |
|---|---|---|
| Fuel fired | MMBtu (GJ) | 4.64 (4.40) |
| LP steam | Mlb (tonne) | 5.34 (11.77) |
| Electricity | kWh | $0.06 |
| Operating days/yr | 360 | |

| Case | Base Case: No Cogeneration | With Cogeneration |
|---|---|---|
| Crude capacity, kbd (tonne/d) | 304.8 (41552) | 304.8 (41552) |
| Process duty, MMBtu/h (MW) | 690.1 (203.0) | 690.1 (203.0) |
| LP steam, Mlb/hr (tonne/hr) | 86.8 (39.4) | 86.8 (39.4) |
| Flue gas exhaust temperature, °C. | 252.0 | 252.0 |
| Fuel fired, MMBtu/h (GJ/h) | 797.8 (841.6) | 963.0 (1016.0) |
| Electric power consumed, kW | 8305.5 | 8305.5 |
| Electric power produced, kW | 0.0 | 40000.0 |

Operating costs

| Fuel, $/d | 88839.02 | 107239.68 |
|---|---|---|
| Steam, $/d | 11119.25 | 11119.25 |
| Electricity, $/d | 11959.86 | 11959.86 |
| Electricity credit, $/d | 0.00 | −57600.00 |
| Total, $/d | 111918.13 | 72718.80 |
| Total, MM$/yr | 40.291 | 26.179 |
| Fuel, $/bbl ($/tonne) | 0.291 (2.138) | 0.352 (2.580) |
| Steam, $/bbl ($/tonne) | 0.036 (0.268) | 0.036 (0.268) |
| Electricity, $/bbl ($/tonne) | 0.039 (0.288) | 0.039 (0.288) |
| Electricity credit, $/bbl ($/tonne) | 0.000 | −0.189 (−1.386) |
| Total, $/bbl ($/tonne) | 0.367 (2.693) | 0.239 (1.750) |

TABLE-continued

Crude Distillation Costs With and Without Cogeneration

Incremental Capital Costs

| Additional capital investment, MM$ | 0 | 22 |
|---|---|---|
| Annualized capital cost, MM$/yr | 0 | 7.26 |
| Annualized capital cost, $/d | 0 | 20166.67 |
| Annualized capital cost, $/bbl ($/tonne) | 0 | 0.066 (0.485) |
| Total cost including capital, MM$/yr | 40.291 | 33.439 |
| Total cost including capital, $/bbl ($/tonne) | 0.367 (2.693) | 0.305 (2.235) |
| Utilities savings for cogeneration, % | | 35 |
| Simple payback for cogeneration, yr | | 1.56 |

The above Table gives a comparison of the base case design without cogeneration and the modified design with cogeneration of electricity. It can be seen that a 40 MW gas turbine provides sufficient heat when the exhaust is secondarily fired in a fired heater to run a crude unit with a capacity of 305 kilobarrels (41552 tonnes) per day. In the cogeneration case, the fuel fired is increased from 798 to 963 MMBtu/h (842 to 1016 GJ/h), while an additional 40 MW of electricity is created, which can be used in the refinery or exported. Because of the value of the cogenerated electricity, the operating costs are reduced from $0.367 per barrel of crude to $0.239, or a savings of roughly $14 million per year. These savings are able to pay off the $22 million incremental capital cost of the turbine in 1.56 years. The fuel that is fired in the gas turbine engine can be natural gas, refinery fuel gas, kerosene or fuel oil.

Although the example clearly shows that the process with cogeneration is economically attractive, there is a serious drawback to that process, which must be overcome. The on-stream availability of the gas turbine engine is lower than is required for the crude distillation unit. Refiners would therefore be reluctant to consider this process if they thought that the crude unit operation would be interrupted every time the gas turbine engine required maintenance.

Figure 2:
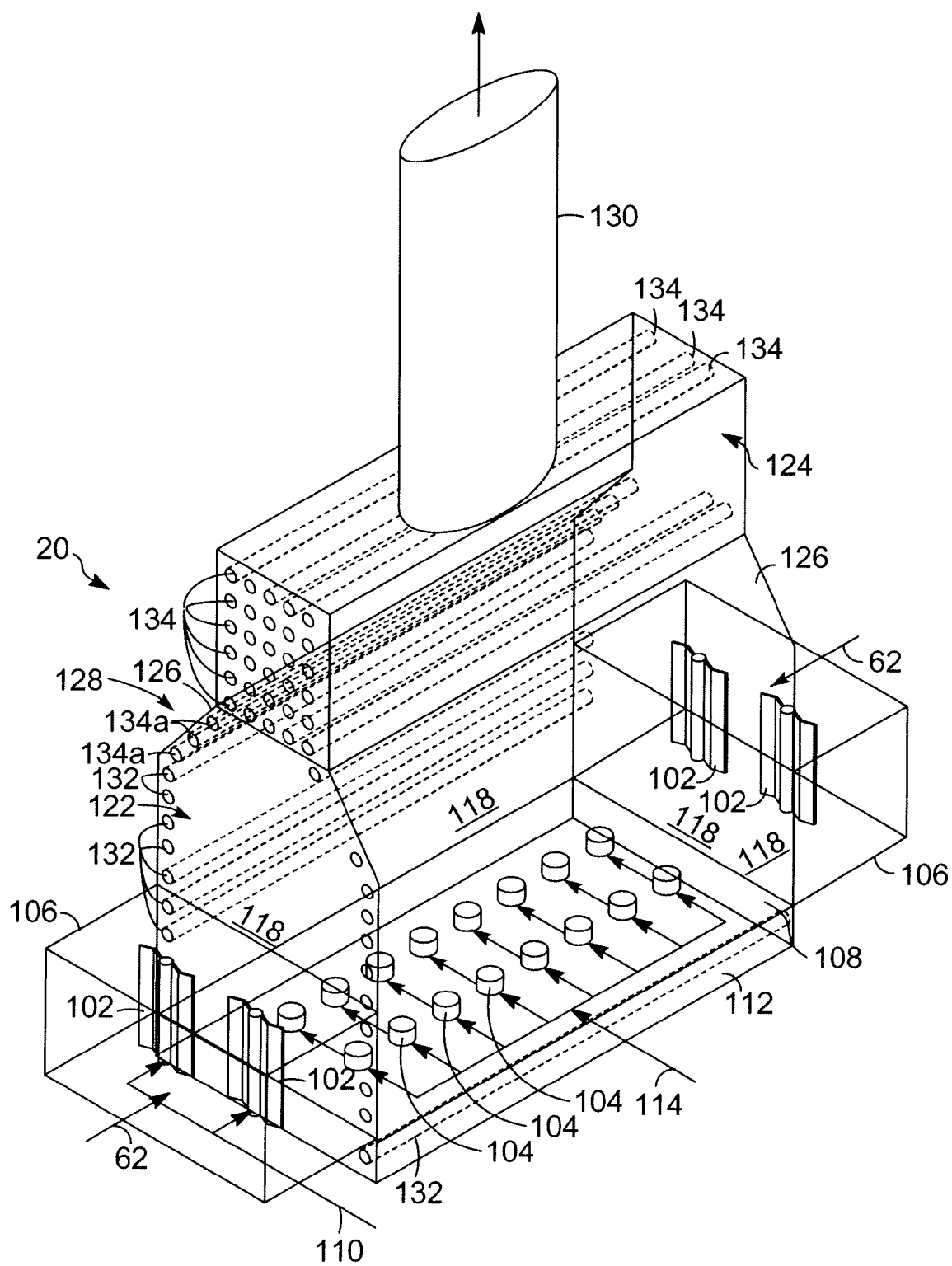
FIG. 2 is an isometric view of a fired heater of the present invention.

This drawback is overcome through the invention of a new fired heater 20, illustrated by the drawing in FIG. 2. FIG. 2 is a schematic drawing of one embodiment of the fired heater 20 and indicates the main features without being restricted to the exact geometry shown. This fired heater 20 uses a combination of at least one duct burner 102 at high capacity and at least one surface burner 104 at low capacity to permit high heat recovery when gas turbine exhaust gas is available, while allowing a rapid switch to natural draft firing of the surface burner 104 at high capacity if the exhaust from the gas turbine engine 60 (FIG. 1) is stopped.

The fired heater 20 comprises a cabin 108 having a plurality of walls 118 and a floor 112 which define a radiant section 122, a convection section 124 and a stack 130. Walls 118 may adjoin sloped roof sections 126 which define a transition section 128 between the radiant section 122 and the convection section 124. The radiant section 122 contains the radiant section tubes 132 and the convection section 124 contains the convection section tubes 134. The convection section tubes 134 may have a smooth outside surface or the convection section tubes 134 may have studs or fins welded to the outside surface. In the fired heater 20, exhaust gas in line 62 from one or more gas turbine engines 60 (FIG. 1) enters the fired heater 20 through gas turbine exhaust ducts 106 at one or both ends of the furnace. FIG. 2 shows a design in which the exhaust gas enters at both ends, but firing from one or more ends of the furnace is also considered within the scope of the invention. Duct burners 102 are located in the gas turbine exhaust duct 106 close to where the duct enters the furnace cabin 108, so as to project a flame from the duct burner 102 into the furnace cabin 108. The hot turbine exhaust gas in gas turbine exhaust duct 106 provides heat and oxygen necessary to combust fuel injected by the duct burners 102. Fuel is provided to duct burners by line 110. The design and operation of duct burners is well known by those skilled in the art. John Zink Company, LLC is one manufacturer of suitable duct burners.

Surface burners 104 are provided in the floor 112 of the fired heater 20. Surface burners may be free convection burners which provide oxygen-containing gas such as air through a passageway that directs air in proximity to injected fuel gas to generate a flame. Although the duct burners 102 and the surface burners 104 shown are designed for fuel gas, both duct and surface burners that can burn liquid fuel are contemplated as well. Fuel gas is provided to surface burners 104 through header 114. The surface burners 104 may provide back-up for situations when the gas turbine exhaust is not available. The surface burners may be continuously fired at a fuel gas flow rate substantially less than maximum capacity and preferably at maximum turndown or minimal capacity, so as to remain lit. In an embodiment, the surface burners 104 may be located in the floor, but the surface burners may be located along the walls. The surface burners may be specified as 8 MMBtu/hr (8.4 GJ/hr) burners, which can be fired continuously at 2 MMBtu/hr (2.1 GJ/hr). There are several advantages to keeping the surface burners lit at maximum turndown. The need for pilot burners, electrical starters or any other method of switching on the burners if the gas turbine exhaust gas in line 62 becomes unavailable is diminished or eliminated. It is not necessary to cool down the furnace and light the surface burners manually if the gas turbine exhaust gas in line 62 from gas turbine 60 (FIG. 1) becomes unavailable. Instead, the surface burners 104 can be rapidly adjusted to full firing rate by increasing the flow rate of fuel gas thereto, allowing the fired heater 20 and downstream crude distillation column 30 (FIG. 1) or any other downstream unit to which heated feed is provided from the fired heater 20 to continue operation while the gas turbine 60 (FIG. 1) undergoes maintenance.

Figure 3:
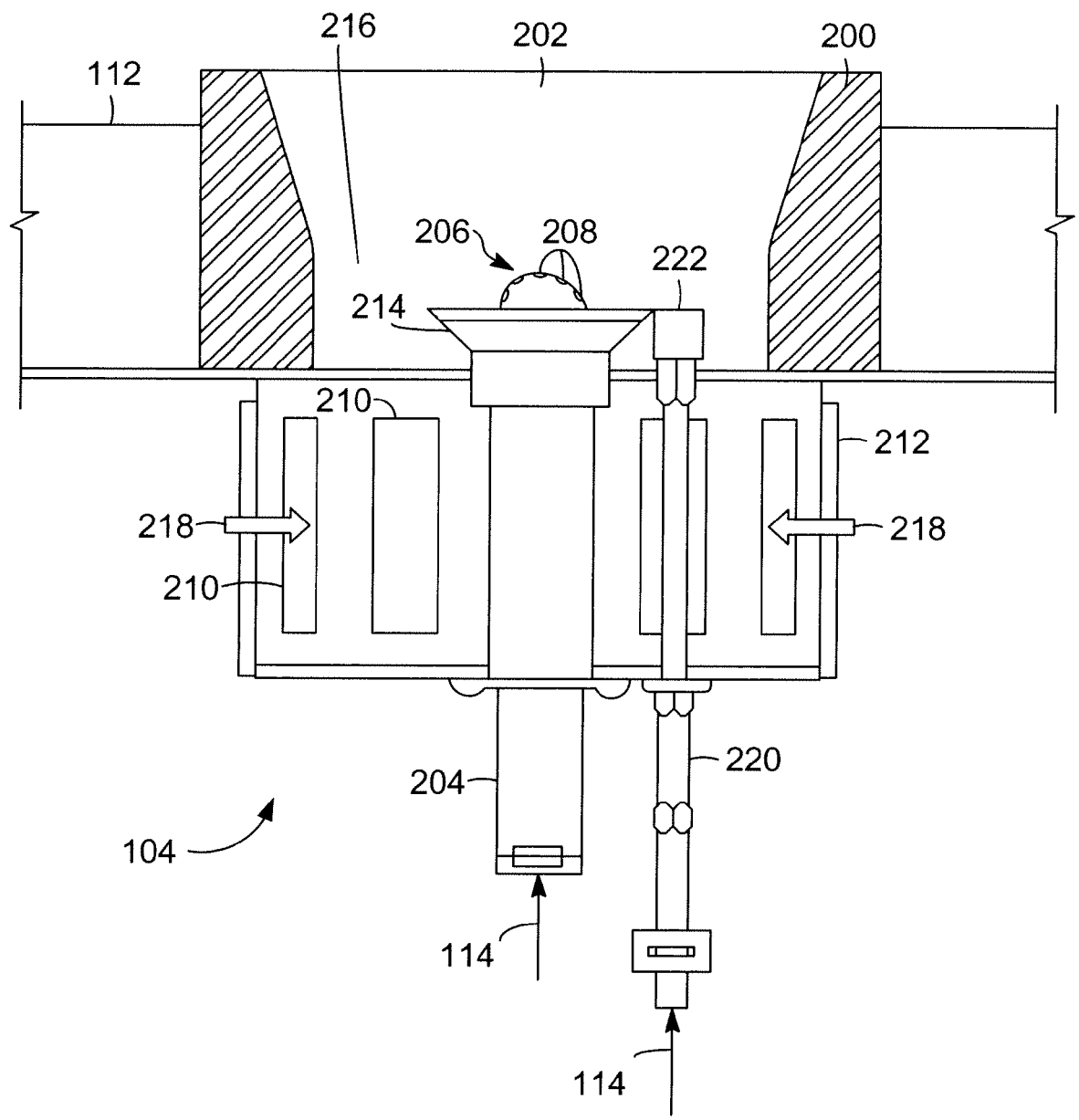
FIG. 3 is a sectional view of a surface burner of the present invention.

A floor type of surface burner 104 is shown in FIG. 3. The surface burner 104 is disposed in the floor 112 and is surrounded by a tile 200 which defines an inner chamber 202. Fuel gas line 114 (FIG. 2) from a fuel source feeds fuel gas into pipe 204 in fluid communication with the fuel source. The pipe 204 terminates in a burner tip 206 which may be unitary with or affixed to the pipe 204. Orifices 208 in the burner tip 206 inject fuel gas into the inner chamber 202. Air indicated by arrows 218 is admitted into the surface burner 104 through air intakes 210 which may be vents in an air register chamber 212. The air intakes 210 direct air into proximity with the fuel. A flame holder 214 surrounding the burner tip 206 deflects air away from the burner tip 206, allowing combustion to occur in a very low air velocity zone at the burner tip 206. The flame holder 214 and inner surface of the tile 200 define a passageway 216 that directs air from the air intakes 210 in the air register chamber 212 into proximity with the orifices 208 in the burner tip 206. Orifices 208 in fluid communication with the air intake 210 and the passageway 216 inject fuel into air from the passageway 216. The surface burner directs air and fuel gas into close proximity with each other to promote combustion. A pilot 220 with a burner 222 next to the flame holder 214 in communication with the fuel gas line 114 is provided as an aid to lighting the surface burners 104 during a cold start of the fired heater 20. The pilot 220 also provides a measure of protection against flame out when the fired heater 20 is operated solely with the surface burners 104 lit. The duct burners 102 operate differently than the surface burners 104 by injecting fuel into an oxygen-containing stream that is passing the duct burner; whereas, the surface burners 104 provide and direct into close proximity the oxygen-containing stream and the fuel gas necessary for combustion. John Zink Company, LLC is also one manufacturer of suitable surface burners.

Premix burners may also be used as surface burners 104. In a premix burner, an intake that admits air into the pipe (not shown) directs air into proximity with the fuel in the pipe and the orifices inject fuel as well as air. Orifices in fluid communication with said air intake receive air and fuel from the passageway.

Figure 4:
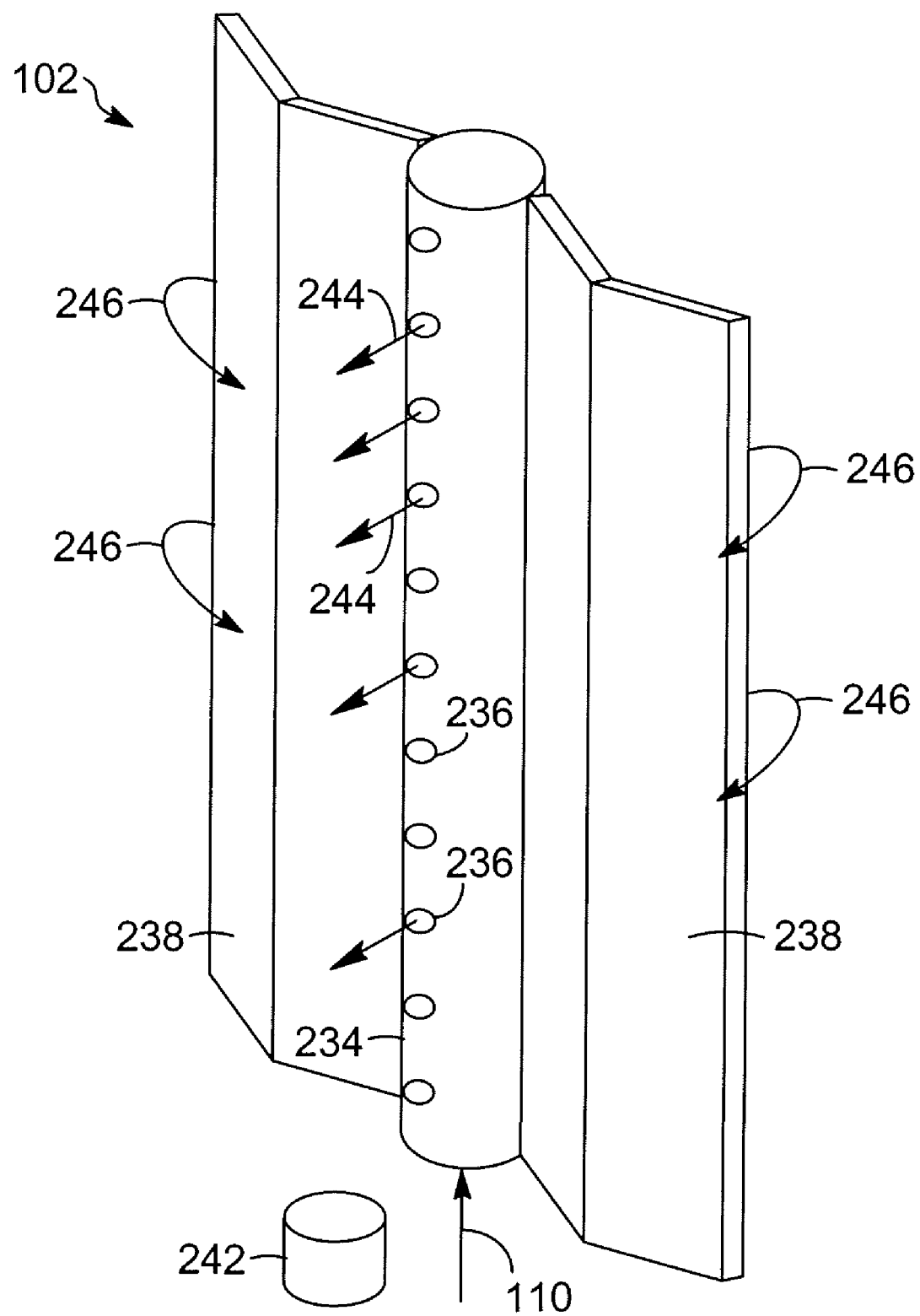
FIG. 4 is an isometric view of a duct burner of the present invention.

A duct burner is shown in FIG. 4. The duct burner 102 includes a distribution pipe 234 for distributing fuel gas from line 110 (FIG. 2) in communication with a fuel gas source. The fuel gas is distributed to orifices 236 in fluid communication with the distribution pipe 234 for injecting fuel gas as shown by arrows 244. At least one baffle 238 on the upstream side of the orifices 236 shields the orifices 236 and the flame issuing from the orifices 236 from gas traveling from the duct 106 into the radiant section 108 (FIG. 2). In an embodiment, the baffle 238 may be perforated. Additionally, the baffle 238 and the distribution pipe 234 may define an intermediate chamber (not shown) into which fuel gas enters from orifices 236 and out of which fuel gas is injected from baffle orifices (not shown) The distribution pipe 234 may include specialized nozzles which are not shown which may provide the orifices (not shown) in fluid communication with the distribution pipe 234 for injecting fuel. As fuel gas is injected from orifices 236, oxygen-containing gas from the turbine exhaust in line 62 (FIG. 2) travels around the baffles 238 as shown by arrows 246 and encounters injected fuel gas to promote combustion. The duct burner 102 typically provides no oxygen to promote combustion, but all oxygen is provided in the duct. The baffles 238 shield the flame of combustion from being extinguished by the oxygen-containing gas traveling through the duct 106. A pilot 242 may also be provided to ensure operation of the duct burner 102.

Turning back to FIG. 2, heating tubes in the fired heater 20 carry fluid material such as crude oil through the fired heater 20 to be heated. Radiant section tubes 132 are disposed along the walls 118 of the radiant section 122. Banks or rows of convection section tubes 134 are disposed along the walls 118 and through the open space between the walls 118 in the convection section 124. The lowest rows, for example, the lowest three rows, of convection section tubes 134 are shock tubes 134a. These shock tubes 134a absorb both radiation heat from the radiant section 122 and convection heat from the flue gas flowing through convection section 124. The shock tubes 134a in the lowest banks 136 can be designed thicker than standard furnace shock tubes to accommodate higher temperatures. The shock tubes 134a may be specified as 9-Chrome, 1-Molybdenum Schedule 80 AW or 347H austenitic stainless steel tubes Schedule 80 AW, which is more resistant to corrosion based fouling due to high-temperature surface oxidation. The other convection section 134 and radiant section tubes 132 may be specified to be 9-Chrome, 1-Molybdenum Schedule 40 AW. Other tube metallurgies may be suitable.

The convection section tubes 134 in the preferred embodiment would be disposed in a triangular pitch, but may be disposed in a square pitch. Multiple banks of convection tubes 134 may be suitable. In an embodiment, 10 to 20 rows of convection tubes 134 may be used, but more or fewer rows of convection tubes may be suitable. Multiple flue gas ducts (not shown) at the top of the convection section 124 may route to one stack 130. In a preferred embodiment there will be two to four flue gas ducts at the top of the convection section 124 routing flue gas to the stack 130.

The surface burners 104 may be arrayed in two rows on the floor 112 of the radiant section 122 although other arrays may be suitable. Preferably, 40 to 200 surface burners 104 may be provided on the floor 112. In an embodiment two duct burners 102 are used in each turbine gas exhaust duct 106, but more or less may be used. The dimensions of the gas turbine exhaust duct 106 are preferably as wide as the outside spacing of each pair of surface burners 104. The bottom of the turbine exhaust duct 106 is spaced above, preferably about 4 feet above the floor 112, so the flames of the surface burners 104 are shielded from being extinguished by the turbine exhaust gas entering through ducts 106. The top of the turbine exhaust duct 106 is below the shock tubes, preferably about 20 feet below the lowest row of convection section tubes 134. The bank of radiant section tubes 132, in the preferred embodiment, extend along the wall 118 adjacent to the turbine exhaust duct 106 in the radiant section from the floor 112 to the lowest convection section shock tubes 134*a*. It is contemplated that one or more furnace cabins can be used together or joined together for necessary capacity. Suitable fuel to the surface burners and duct burners may be fuel gas and fuel oil. In the case that fuel oil is used as fuel instead of fuel gas, the surface burners and duct burners will have slightly different features than shown herein.

In the furnace design of the invention the radiant section tubes 132 and the shock tubes 134*a* may be used for heating crude oil feed in line 16 to the atmospheric distillation column 30 (FIG. 1). The convection section tubes 134 in the upper part of the convection section 124 can be used for a variety of purposes, such as preheating crude oil before it passes into the shock tubes 134*a*, to generate or superheat steam, or to provide heat for the reboiler 46 for the kerosene side stripper 36 or other side stripper of the atmospheric distillation column 30 (FIG. 1).

Other variations and embodiments of the fired heater of the invention are contemplated. For example, the fired heater may incorporate an induced draft fan connected to the stack 130 to allow the convection section to be designed for high flue gas mass flux to minimize convection section capital cost.

What is claimed is:

1. A fired heater comprising:
a furnace cabin including a plurality of walls and a floor defining a radiant section and a convection section;
a duct adjacent to and communicating with said radiant section;
at least one duct burner located in said duct, said burner including a pipe in communication with a fuel source and orifices in fluid communication with said pipe for injecting fuel;
at least one surface burner located in one or more of said walls and said floor of said furnace cabin, said surface burner including a pipe in fluid communication with a fuel source and an air intake for directing air in proximity to fuel from said fuel source and orifices in fluid communication with said air intake for injecting fuel; and
a plurality of tubes in said furnace cabin for carrying a fluid material through said heater to heat said fluid material.

2. The fired heater of claim 1 wherein said duct burner includes a baffle to shield the orifices from gas traveling from said duct into said furnace cabin.

3. The fired heater of claim 1 wherein all of said orifices in said duct burner communicate with a fuel source.

4. The fired heater of claim 1 wherein said pipe of said surface burner terminates at a tip with said orifices being in said tip.

5. The fired heater of claim 1 wherein said tubes in said radiant section extend adjacent to at least one of a wall and a floor of said radiant section.

6. The fired heater of claim 1 wherein said tubes in said convection section extend through an interior space between walls defining said convection section.

7. The fired heater of claim 1 wherein said air intake of said surface burner comprises a vent for admitting air from ambient into proximity with said orifices.

\* \* \* \* \*